No. 729,578. PATENTED JUNE 2, 1903.
H. M. HARDING.
TELPHER.
APPLICATION FILED AUG. 22, 1902.
NO MODEL.
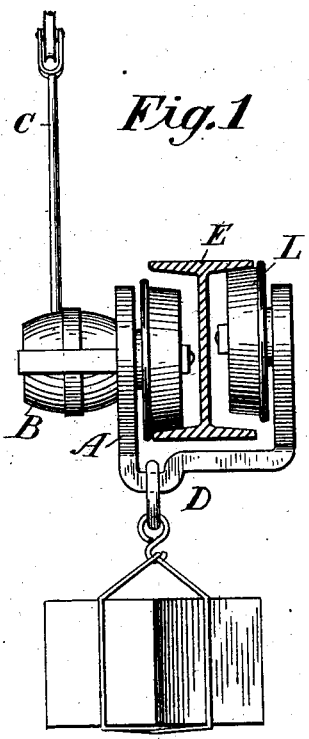
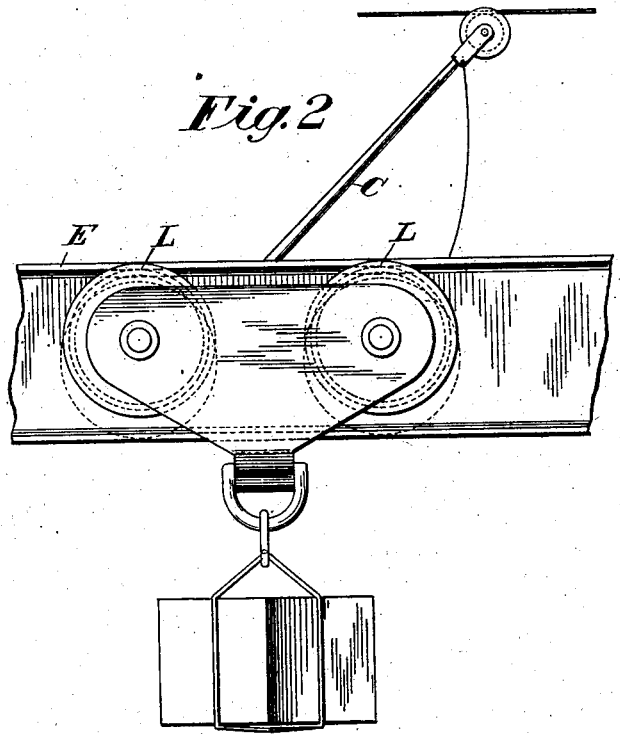

No. 729,578. Patented June 2, 1903.

UNITED STATES PATENT OFFICE.

HENRY M. HARDING, OF NEW YORK, N. Y.

TELPHER.

SPECIFICATION forming part of Letters Patent No. 729,578, dated June 2, 1903.

Application filed August 22, 1902. Serial No. 120,630. (No model.)

*To all whom it may concern:*

Be it known that I, HENRY M. HARDING, residing at New York, in the county and State of New York, have invented certain new and useful Improvements in Telphers or Supports for Suspended Cable-Track Roads in Connection with Suspending Trucks or Cars, of which the following is a specification.

The object of my invention is to provide means for carrying telphers on I-beams or rails or similar overhead structures.

In the drawings forming part of this specification, Figure 1 is an end view of the telpher-carriage, the beam being shown in section. Fig. 2 is a side elevation.

In telphers for handling merchandise in warehouses, docks, factories, &c., it is very desirable that the motors should be placed on one side only of the carriage. Two motors coupled together are ordinarily used for reasons well known to those skilled in electric traction. This necessity for putting the motors on one side arises from the fact that the overhead space is cut up, so that there is not room for the necessary switches should the motors be placed one on each side. It is also necessary in order to get the best traction results that the load should be hung as nearly as possible under the wheels on the motor side of the carriage. It will be seen that the weight of such a load, together with the weight of the motors, would cause the carriage to tilt were not means taken to prevent it.

In my construction I use a telpher having four wheels running on stub-shafts, which are supported in a frame A. On two of these shafts I place the motors B, the current being supplied by the trolley C. The frame is provided with a suspending or weight-carrying device D, located at one side, as clearly shown in Fig. 1. On the frame on the opposite side from the motors is a wheel L, so placed on the frame A that it will bear against the under side of the upper flange of the I-beam E. The tendency of the telpher to tilt is prevented by the bearing of this wheel against the under side of the flange; but at the same time the full tractive power of the load is utilized.

The bevels of the wheels are adapted to the bevels of the flanges of the I-beam.

What I claim, and desire to secure by Letters Patent, is—

1. In an overhead electric carrier, the combination of a frame, wheels supported on one side of said frame and adapted to run on the overhead beam, electric motors on the shafts of said wheels, a weight-carrying device situated substantially beneath said wheels and means to prevent tilting of the carriage, substantially as described.

2. In an overhead electric carrier, the combination of a frame, wheels supported on one side of said frame and adapted to run on the overhead beam, electric motors on the shafts of said wheels, a weight-carrying device situated substantially beneath said wheels, and a wheel on the opposite side of the carriage adapted to bear against the under side of the upper flange substantially as described.

In witness whereof I have hereunto set my hand, in the city, county, and State of New York, this 16th day of August, 1902.

HENRY M. HARDING.

Witnesses:
JOHN J. RANAGAN,
H. J. LILLIE.